Jan. 26, 1965 R. D. WAITE ETAL 3,166,941
GAUGE COVER CASE AND BACK PLATE
Filed May 31, 1963 2 Sheets-Sheet 1
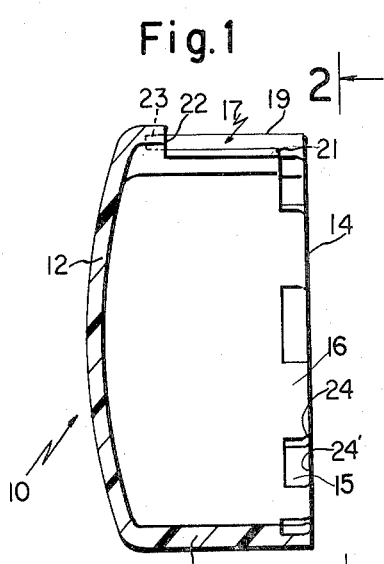
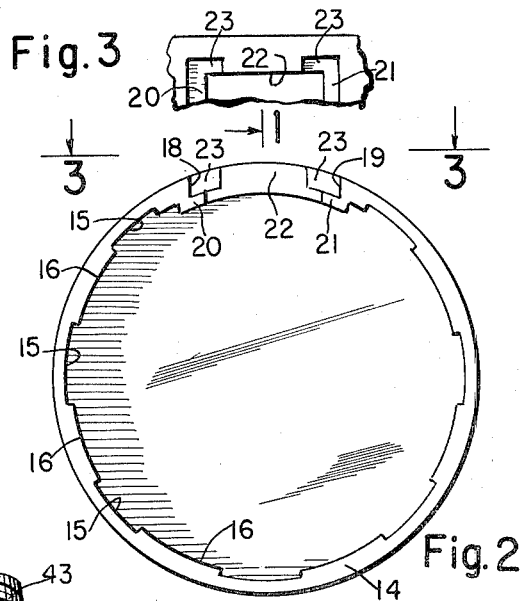
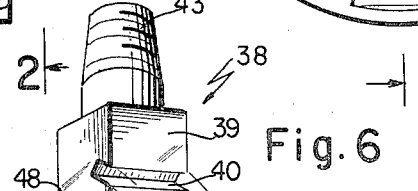
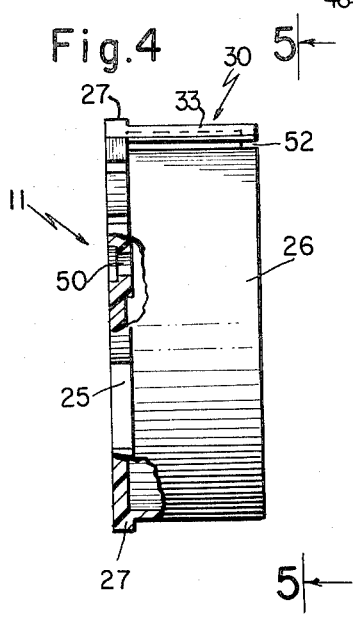
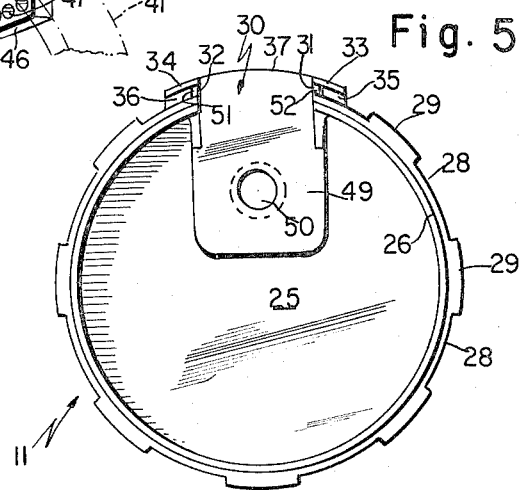
INVENTOR
RALPH D. WAITE
EARL DONALD ZUCK
BY
Robertson & Smythe
ATTORNEYS

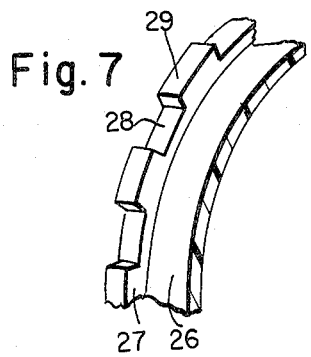
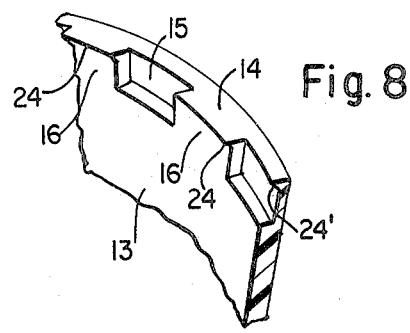
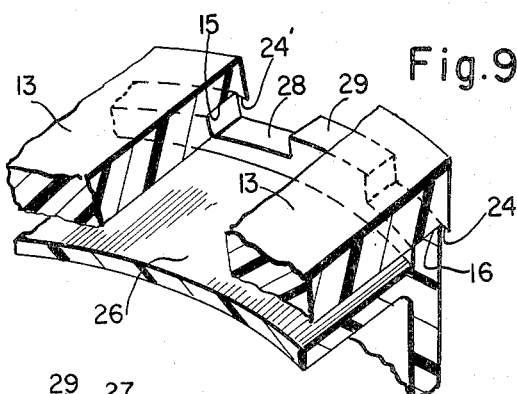
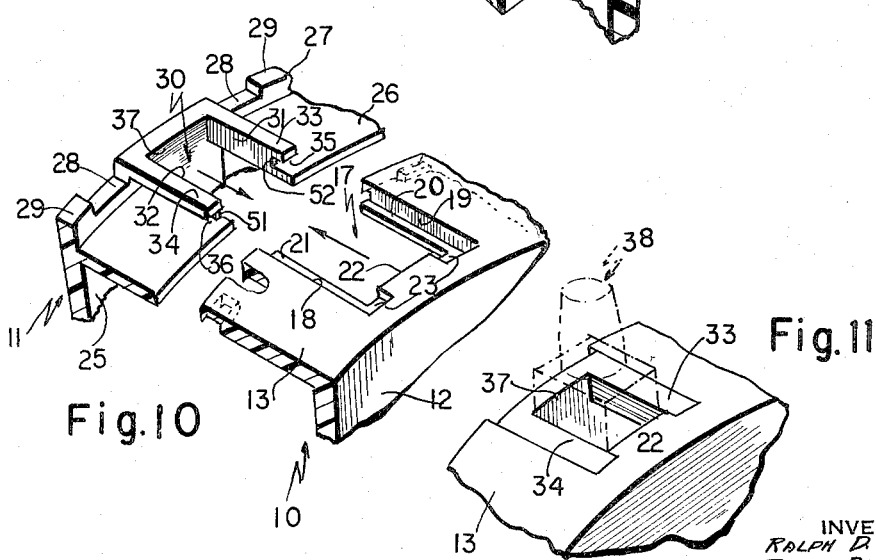

United States Patent Office 3,166,941
Patented Jan. 26, 1965

3,166,941
GAUGE COVER CASE AND BACK PLATE
Ralph D. Waite, Sellersville, and Earl Donald Zuck, Quakertown, Pa., assignors to Ametek, Inc., New York, N.Y., a corporation of Delaware
Filed May 31, 1963, Ser. No. 284,726
10 Claims. (Cl. 73—431)

The present invention relates to gauges, and particularly to a cover case and back plate for a gauge such as a pressure gauge or the like.

It has been found desirable to provide a gauge having a bottom connection which can be assembled with ease and which will present a neat appearance.

One of the objects of the invention is to provide a gauge case and cover which can be assembled easily.

Another of the objects of the invention is to provide a cover and back plate for a gauge in which the socket of the gauge extends through the side wall of the cover rather than through the back plate, and in which the cover and back plate snap together to provide ready separation thereof.

Another object of the invention is to provide such a cover in which the snap connection is such as to prevent relative turning between the cover case and back plate.

Still another object of the invention is to provide such a cover case and back plate in which the snap connection as well as that between the cover side wall and gauge socket will provide a relatively tight joint.

In one aspect of the invention, a gauge cover may be made from a transparent plastic and may comprise a circular front face surrounded by a cylindrical side wall. The inside of the side wall, along the edge thereof opposite that joined to the front face, may include alternate recessed portions adapted to mate with portions between alternate recessed portions about the periphery of a back plate which also may be made of one of the thermoplastic resins.

In another aspect of the invention, the back plate may include a cylindrical side wall of such a diameter that it is adapted to be received within the cylindrical side wall of the cover.

In still another aspect of the invention, the side walls of both the cover and back plate may be provided with an opening adapted to receive the socket of the gauge to be housed within the cover. The opening in the side wall of the back plate may form three sides adapted to contact three sides of the gauge socket while the fourth side is formed by the edge of the opening in the side wall of the cover that is parallel with the front face thereof.

In still another aspect of the invention, overlapping, interlocking flanges may be provided along the edges of the two openings that are at right angles to the front face and the back plate for effecting a relatively tight connection between the edges of the openings in the side walls of the cover and back plate.

The above, other objects and novel features of the gauge cover and back plate will become apparent from the following specification and accompanying drawings which are merely exemplary.

In the drawings:

FIG. 1 is a sectional view of a cover to which the principles of the invention have been applied;

FIG. 2 is a view looking in the direction of the arrows along line 2—2 of FIG. 1;

FIG. 3 is a view of a fragment of the cover as viewed along line 3—3 of FIG. 2;

FIG. 4 is a partial sectional view of a back plate to which the principles of the invention have been applied;

FIG. 5 is a view looking in the direction of the arrows along line 5—5 of FIG. 4;

FIG. 6 is a view of a gauge socket;

FIG. 7 is a perspective view of a fragment of the back plate;

FIG. 8 is a perspective view of a fragment of the side wall of the cover;

FIG. 9 is a perspective view of the assembled fragments of FIGS. 7 and 8;

FIG. 10 is a perspective view of fragments of the cover and back plate during assembly; and FIG. 11 shows these two fragments in assembled relation.

Referring to the drawings and particularly to FIGS. 1 to 5, the principles of the invention are shown as applied to a housing for a gauge including a cover 10 and a back plate 11. Both of these elements are preferably made from a formulation of polycarbonate resin producing a transparent cover. It may include a circular front face 12 and a cylindrical side wall 13 surrounding said face and integrally connected thereto. Referring to FIG. 2, the edge 14 of wall 13 opposite face 12 is provided with alternate recesses 15 providing elevated lands 16 therebetween.

The side wall 13 may have an opening 17 therein including three sides, i.e., parallel spaced sides 18 and 19, having flanges 20 and 21 therealong forming a track means extending from the edge 14 to an end surface 22 of the three-sided opening 17. A recess 23 may be provided in the surface 22. Referring to FIG. 8, the peripheral interrupted edge of the wall 13 along the elevated portions 16 as well as along the recesses 15 may include radially inwardly directed, tapered edges 24, 24' all for a purpose to be described later.

Referring to FIGS. 4 and 5, the back plate may include a circular portion 25 having a cylindrical side wall 26 integrally joined thereto. The outside diameter of the wall 26 is slightly less than the inside diameter of the wall 13 of cover 10, providing a flange 27 extending radially slightly beyond the wall 26. The flange 27 may be provided with alternate recessed portions 28 and raised portions 29 adapted, respectively, to mate with portions 16 and 15 of the cover 10.

The wall 26 of back plate 11 is provided with a three-sided opening 30 formed by spaced parallel edges 31 and 32 having flanges 33 and 34 providing grooved trackways 35, 36 therealong for receiving tracks 20, 21 on wall 13 of cover 10; and an end edge 37 comprising the third wall.

Referring to FIG. 6, a socket 38 for a Bourdon tube type of gauge may comprise a body portion 39 of solid, substantially cubical construction having a slot 40 therein for receiving one end of a Bourdon tube 41. It may also be provided with a threaded nipple 43 having a central passage that communicates, within the body 39, with the interior of tube 41. A slot 44 may be provided in body 39 forming spaced parallel walls 45, 46. The wall 46 may have holes 47 therein for mounting the operating mechanism of the gauge, and the wall 45 may include a threaded hole 48 for a purpose to be described.

The back plate 11 may be provided with a reinforcing section 49 extending from the wall 26 radially inwardly through the opening 30, and a hole 50 may be provided therein. The gauge socket 38 may be mounted within opening 30 so that holes 50 and 48 are aligned. A screw may be threaded from the outside of wall 25 through it and into the threaded hole 48 in body 39. The dimensions of the body 39 and the spacing of edges 31 and 32 may be such that a relatively tight joint is formed between said walls and body.

With the cover 10 and back wall 26 in the position shown in FIG. 10, and with socket 38 in place as described above, cover 10 is moved toward plate 11 so that track elements 20, 21 register with grooves 36, 35 on wall 26 and the two are forced together into the condition shown in FIG. 11. The arrangement and construction of the parts are such that the tapered edges 24, 24' (FIG. 8) snap over the outer edges of the recesses 28 and raised portions 29, thereby to assist in retaining the parts together. The inner ends of the flanges 33 and 34 are provided with notches 51, 52 for cooperation with the recesses 23 (FIG. 3) of cover 10.

Although the various features of the gauge casing have been shown and described in detail to fully disclose one embodiment of the invention, it will be evident that changes may be made in such details and certain features may be used without others without departing from the principles of the invention.

What is claimed is:

1. In a gauge casing, a cover comprising a circular face portion surrounded by a cylindrical wall, said wall having an opening with track means along parallel spaced edges of said opening; a back plate for said casing; an integral cylindrical wall surrounding said back plate, said back plate wall having an opening therein; track means along spaced parallel edges of the opening in the back plate wall, the construction and arrangement of the parts being such that the back plate is received within the face wall and the track means along the parallel edges of both openings interfit; and means on the face wall and back plate providing a snap fit when the face portion and back plate are forced together.

2. In a gauge casing, a cover comprising a circular face portion surrounded by a cylindrical wall, said wall having an opening with track means along parallel spaced edges of said opening; a back plate for said casing; an integral cylindrical wall surrounding said back plate, said back plate wall having an opening therein; track means along spaced parallel edges of the opening in the back plate wall, the construction and arrangement of the parts being such that the back plate is received within the face wall and the track means along the parallel edges of both openings interfit; and alternate raised and recessed portions about the periphery of said back plate and the periphery of the face wall opposite the face portion, said alternate raised portions on the back plate being arranged to mate with corresponding recessed portions on the wall of said face portion.

3. In a gauge casing, a cover comprising a circular face portion surrounded by a cylindrical wall, said wall having an opening with track means along parallel spaced edges of said opening; a back plate for said casing; an integral cylindrical wall surrounding said back plate, said back plate wall having an opening therein; track means along spaced parallel edges of the opening in the back plate wall, the construction and arrangement of the parts being such that the back plate is received within the face wall and the track means along the parallel edges of both openings interfit; means on the face wall and back plate providing a snap fit when the face portion and back plate are forced together; and a gauge socket mounted within said casing and extending through the openings in the walls of said back plate and face wall.

4. In a gauge casing, a cover comprising a circular face portion surrounded by a cylindrical wall, said wall having an opening with track means along parallel spaced edges of said opening; a back plate for said casing; an integral cylindrical wall surrounding said back plate, said back plate wall having an opening therein; track means along spaced parallel edges of the opening in the back plate wall, the construction and arrangement of the parts being such that the back plate is received within the face wall and the track means along the parallel edges of both openings interfit; alternate raised and recessed portions about the periphery of said back plate and the periphery of the face wall opposite the face portion, said alternate raised portions on the back plate being arranged to mate with corresponding recessed portions on the wall of said face portion; and a gauge socket mounted within said casing and extending through the openings in the walls of said back plate and face wall.

5. In a gauge casing, a cover comprising a circular face portion surrounded by a cylindrical wall, said wall having an opening with track means along parallel spaced edges of said opening; a back plate for said casing; an integral cylindrical wall surrounding said back plate, said back plate wall having an opening therein; track means along spaced parallel edges of the opening in the back plate wall, the construction and arrangement of the parts being such that the back plate is received within the face wall and the track means along the parallel edges of both openings interfit; and means on the face wall and back plate providing a snap fit when the face portion and back plate are forced together, said last means including tapered edge means about the periphery of the face wall adapted to cooperate with the peripheral edge around the back plate wall.

6. In a gauge casing, a cover comprising a circular face portion surrounded by a cylindrical wall, said wall having an opening with track means along parallel spaced edges of said opening; a back plate for said casing; an integral cylindrical wall surrounding said back plate, said back plate wall having an opening therein; track means along spaced parallel edges of the opening in the back plate wall, the construction and arrangement of the parts being such that the back plate is received within the face wall and the track means along the parallel edges of both openings interfit; alternate raised and recessed portions about the periphery of said back plate and the periphery of the face wall opposite the face portion, said alternate raised portions on the back plate being arranged to mate with corresponding recessed portions on the wall of said face portion; and tapered means along the edge of said raised and recessed portions about the face wall adapted to cooperate with the edges along the raised and recessed portions about the back plate wall.

7. In a gauge casing, a cover comprising a circular face portion surrounded by a cylindrical wall, said wall having an opening with track means along parallel spaced edges of said opening; a back plate for said casing; an integral cylindrical wall surrounding said back plate, said back plate wall having an opening therein; track means along spaced parallel edges of the opening in the back plate wall, the construction and arrangement of the parts being such that the back plate is received within the face wall and the track means along the parallel edges of both openings interfit; means on the face wall and back plate providing a snap fit when the face portion and back plate are forced together, said last means including tapered edge means about the periphery of the face wall adapted to cooperate with the peripheral edge around the back plate wall; and a gauge socket mounted within said casing and extending through the openings in the walls of said back plate and face wall.

8. In a gauge casing, a cover comprising a circular face portion surrounded by a cylindrical wall, said wall having an opening with track means along parallel spaced edges of said opening; a back plate for said casing; an integral cylindrical wall surrounding said back plate, said back plate wall having an opening therein; track means along spaced parallel edges of the opening in the back plate wall, the construction and arrangement of the parts being such that the back plate is received within the face wall and the track means along the parallel edges of both openings interfit; alternate raised and recessed portions about the periphery of said back plate and the periphery of the face wall opposite the face portion, said alternate raised portions on the back plate being arranged to mate with corresponding recessed portions on the wall of said face portion, said alternate raised and recessed portions about the periphery of the face wall including tapered edge means adapted to cooperate with the peripheral edge around the back plate wall; and a gauge socket mounted within said casing and extending through the openings in the walls of said back plate and face wall.

9. In a gauge casing, a cover comprising a circular face portion surrounded by a cylindrical wall, said wall having a three-sided opening with track means along parallel spaced edges of two of the sides of said opening; a back plate for said casing; an integral cylindrical wall surrounding said back plate, said back plate wall having a three-sided opening therein; track means along spaced parallel edges of two of the sides of said back plate wall opening, the ends of said track means opposite those adjacent said back wall being slotted to overlap the third side of the opening in said face wall, the construction and arrangement of the parts being such that the back plate wall is received within the face wall and the track means along the parallel edges of both openings interfit; and means on the face wall and back plate providing a snap fit when the face portion and back plate are forced together.

10. In a gauge casing, a cover comprising a circular face portion surrounded by a cylindrical wall, said wall having a three-sided opening with track means along parallel spaced edges of two of the sides of said opening; a back plate for said casing; an integral cylindrical wall surrounding said back plate, said back plate wall having a three-sided opening therein; track means along spaced parallel edges of two of the sides of said back plate wall opening, the ends of said track means opposite those adjacent said back wall being slotted to overlap the third side of the opening in said face wall, the construction and arrangement of the parts being such that the back plate wall is received within the face wall and the track means along the parallel edges of both openings interfit; and alternate raised and recessed portions about the periphery of said back plate and the periphery of the face wall opposite the face portion, said alternate raised portions on the back plate being arranged to mate with corresponding recessed portions on the wall of said face portion.

References Cited in the file of this patent
UNITED STATES PATENTS

| | | |
|---|---|---|
| 2,267,056 | Tracy | Dec. 23, 1941 |
| 2,670,870 | Fleischer | Mar. 2, 1954 |

FOREIGN PATENTS

| | | |
|---|---|---|
| 841,800 | Germany | June 19, 1952 |